US006763662B2

(12) United States Patent
Hendriks

(10) Patent No.: US 6,763,662 B2
(45) Date of Patent: Jul. 20, 2004

(54) INSTALLATION FOR THE GENERATION OF ENERGY

(75) Inventor: Rudolf Hendriks, Velp (NL)

(73) Assignees: Turboconsult B.V., Velp (NL); A.S.A. B.V., Rockanje (NL)

( * ) Notice: Subject to any disclaimer, the term of this patent is extended or adjusted under 35 U.S.C. 154(b) by 0 days.

(21) Appl. No.: 10/250,606

(22) PCT Filed: Jan. 2, 2002

(86) PCT No.: PCT/NL02/00001

§ 371 (c)(1),
(2), (4) Date: Nov. 3, 2003

(87) PCT Pub. No.: WO02/053894

PCT Pub. Date: Jul. 11, 2002

(65) Prior Publication Data

US 2004/0055271 A1 Mar. 25, 2004

(30) Foreign Application Priority Data

Jan. 4, 2001 (NL) .............................................. 1017029

(51) Int. Cl.[7] .............................. F02C 1/00; F02C 7/143
(52) U.S. Cl. ........................... 60/728; 60/775; 60/39.53
(58) Field of Search ....................... 60/775, 728, 39.53; F02C 7/143

(56) References Cited

U.S. PATENT DOCUMENTS

| | | | | |
|---|---|---|---|---|
| 2,651,174 A | * | 9/1953 | Bolsezian ..................... | 60/728 |
| 2,845,776 A | * | 8/1958 | Traupel ........................ | 60/728 |
| 5,669,217 A | * | 9/1997 | Anderson ..................... | 60/775 |
| 5,724,806 A | * | 3/1998 | Horner ......................... | 60/728 |

FOREIGN PATENT DOCUMENTS

| | | | | |
|---|---|---|---|---|
| EP | 444913 A1 | * | 9/1991 | ........... F02C/7/143 |
| EP | 540787 A1 | * | 5/1993 | ........... F02C/7/143 |
| EP | 770771 A1 | * | 5/1997 | ........... F02C/7/143 |
| EP | 1039115 A2 | * | 9/2000 | ........... F02C/7/143 |
| FR | 1.007.140 | | 5/1952 | |
| FR | 1308962 | * | 10/1962 | ........... F02C/7/143 |
| JP | 52014117 A | * | 2/1977 | ................. 60/728 |
| JP | 07247862 A | * | 9/1995 | ........... F02C/7/143 |

* cited by examiner

Primary Examiner—Thomas Denion
Assistant Examiner—Thai-Ba Trieu
(74) Attorney, Agent, or Firm—Troutman Sanders LLP; Ryan A. Schneider

(57) ABSTRACT

An installation for generating energy comprises a compressor assembly for compressing air, having a low-pressure compressor, which is connected to a high-pressure compressor via a primary air path. Furthermore, a compressor turbine assembly is provided for the purpose of driving the low-pressure compressor and/or the high-pressure compressor. The installation also has a combustion device for burning a suitable mixture of compressed air and a fuel, and a power turbine with a rotatable shaft for releasing mechanical energy. An exhaust-gas pipe system is connected to the exhaust-gas outlet of the power turbine. The installation comprises a secondary air path which, at an inlet end thereof, is connected between the outlet of the low-pressure compressor and the inlet of the high-pressure compressor, in such a manner that, of the compressed air originating from the outlet of the low-pressure compressor, a primary airflow passes via the primary air path to the high-pressure compressor and a secondary airflow passes into the secondary air path. At the secondary air path, first water injection means are provided for injecting water into the secondary airflow. The secondary air path is connected, at an outlet end thereof, to the connection between the outlet of the compressor turbine assembly and the inlet of the power turbine.

18 Claims, 1 Drawing Sheet

INSTALLATION FOR THE GENERATION OF ENERGY

CROSS REFERENCE TO RELATED APPLICATION

This application claims priority to International Application No. PCT/NL02/00001 filed Jan. 2, 2002, claiming priority of Netherlands application No. 1017029 filed Jan. 4, 2001.

FIELD OF THE INVENTION

The present invention relates to an installation for generating energy.

BACKGROUND OF THE INVENTION

U.S. Pat. No. 5,669,217 and EP 1 039 115 each disclose an installation for generating energy having a compressor assembly for compressing air. The compressor assembly comprises:

- a low-pressure compressor having an air inlet and an outlet,
- a high-pressure compressor having an inlet and an outlet, the outlet of the low-pressure compressor being connected to the inlet of the high-pressure compressor via a primary air path,
- a compressor turbine assembly for driving the low-pressure compressor and/or the high-pressure compressor, which compressor turbine assembly comprises a single compressor turbine or a plurality of compressor turbines arranged in series, and which compressor turbine assembly has an inlet and an outlet, the inlet being connected to the outlet of the high-pressure compressor.

The known installations further comprise cooling means for cooling the air at a location which lies upstream of the outlet of the high-pressure compressor and a combustion device for burning a suitable mixture of compressed air and a fuel.

The known installations further comprise a power turbine with a rotatable shaft for delivering mechanical energy, which power turbine has an inlet, which is connected to the outlet of the compressor turbine assembly, and an exhaust-gas outlet. Also provided is an exhaust-gas pipe system, an inlet end of which is connected to the exhaust-gas outlet of the power turbine.

In these known installations, the cooling means for cooling the air between the low-pressure compressor and the high-pressure compressor are designed as water injection means.

As is known from the prior art, there are various reasons for using water injection in an installation of this type. One important reason is that the water injection creates the possibility of achieving a higher efficiency of the installation. Another reason is the possibility of reducing the polluting emissions from the installation.

It should be noted that the term "water injection" in the context of the present invention incorporates any form of injection of water, i.e. including the atomisation of water, the injection of preheated water or of steam, etc.

With the installations, which have become known to date, the advantageous effects referred to above cannot be achieved to a satisfactory extent.

OBJECTS OF THE INVENTION

A first object of the present invention is to propose measures, which lead to an improved installation.

In particular, it is an object of the invention to provide an installation with a higher efficiency than the known installations of the type described in the preamble.

Another object of the invention is to propose measures through which optimum use is made, for the heating/evaporation of the injected water, of the heat in the exhaust gases from the installation.

Yet another object is to provide an installation with lower polluting emissions than the known installations of the type described in the preamble.

Yet another object is to provide an installation in which optimum operating conditions are created for one or more of the components of the installation, which is advantageous, for example, for the technical implementation of the relevant component(s).

SUMMARY OF THE INVENTION

The present invention provides an installation for generating energy, which is characterized in that a secondary air path is provided, which, at an inlet end thereof, is connected between the outlet of the low-pressure compressor and the inlet of the high-pressure compressor, in such a manner that, of the compressed air originating from the outlet of the low-pressure compressor, a primary airflow passes to the high-pressure compressor and a secondary airflow passes into the secondary air path, and in that at the secondary air path there are first water injection means for injecting water into the secondary airflow, and in that the secondary air path, at an outlet end thereof, is connected to the connection between the outlet of the compressor turbine assembly and the inlet of the power turbine.

Dividing the airflow originating from the low-pressure compressor into a primary airflow and a secondary airflow allows optimum operating conditions to be achieved for the high-pressure compressor, while it is also possible for effective injection of water into the secondary airflow to take place. In this case, the cooling means which cool the primary airflow may likewise be designed as water injection means which, however, are independent of the water injection means for the secondary airflow.

Preferably, the primary airflow is greater than the secondary airflow; by way of example, the primary airflow is 70–90% and the secondary airflow 10–30% of the total airflow delivered by the low-pressure compressor.

The secondary airflow is combined with the primary airflow downstream of the compressor turbine assembly, so that this secondary airflow can be kept at a relatively low pressure. If the pressure at the point where the two airflows are combined is higher than at the outlet of the low-pressure compressor, it is possible to provide a fan, an auxiliary compressor, which imparts a higher pressure to the secondary airflow. By way of example, this fan is an electrically driven fan.

Preferably a heat exchanger is provided which effects a heat transfer between the exhaust gases in the exhaust-gas pipe system, on the one hand, and the secondary airflow, on the other hand, preferably downstream of the first water injection means. In this way, it becomes possible for as much water as possible to be introduced into the secondary airflow and to be evaporated using the heat from the exhaust gases.

It should be noted that, within the context of the description, which follows, and the claims, numerical words are used, such as first, second, third, etc. These numerical words are used only to identify the separate components, and do not provide any indication of the number of similar components which is or should be present in the installation. For example, it is conceivable to produce an installation in which the fourth heat exchanger, which is yet to be described, is absent, yet the fifth and sixth heat exchangers, which are yet to be described in more detail, are nevertheless present.

Further advantageous embodiments of the installation according to the invention are described in the claims and the following description which is based on the drawing.

DETAILED DESCRIPTION OF PREFERRED EMBODIMENTS

Figure 1:
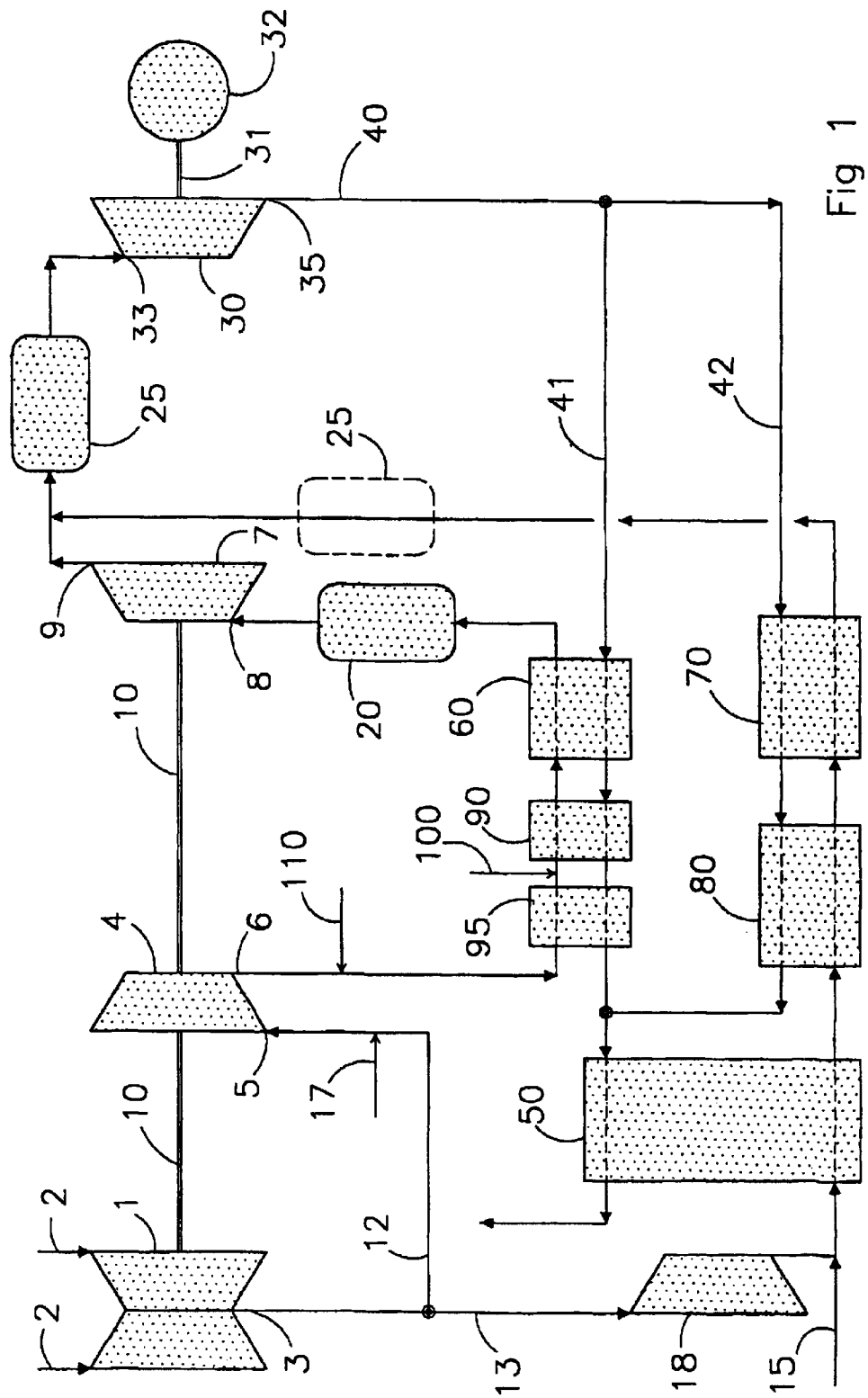
FIG. 1 shows a circuit diagram of an exemplary embodiment of the installation according to the invention.

FIG. 1 shows an installation for generating energy according to the invention. This installation comprises a compressor assembly for compressing air. In this example, the compressor assembly comprises:

- a low-pressure compressor 1 with an air inlet 2 and an outlet 3,
- a high-pressure compressor 4 with an inlet 5 and an outlet 6, the outlet 3 of the low-pressure compressor being connected to the inlet 5 of the high-pressure compressor 4,
- a compressor turbine assembly for driving the low-pressure compressor 1 and the high-pressure compressor 4, which compressor turbine assembly includes a single compressor turbine 7, and which compressor turbine assembly has an inlet 8 and an outlet 9, the inlet 8 being connected to the outlet of the high-pressure compressor 4.

In this example, the compressors 1, 4 and the compressor turbine 7 are arranged on a single common shaft 10.

A primary air path 12, extends between the outlet 3 and the inlet 5, via which primary air path 12 a primary airflow passes from the low-pressure compressor 1 to the high-pressure compressor 4. An inlet end of a secondary air path 13 is connected to the said primary air path 12, in such a manner that, of the compressed air originating from the outlet of the low-pressure compressor 1, a primary airflow passes to the high-pressure compressor 4 and a secondary airflow into the secondary air path 13.

The airflow from the low-pressure compressor 1 is preferably divided in such a manner that the primary airflow is greater than the secondary airflow; by way of example, the primary airflow amounts to 85% and the secondary airflow to 15% of the total airflow. The ratio between the two airflows may be constant, for example by the secondary air path having a defined passage area with respect to the passage area of the primary air path 12. If appropriate, control means can be provided, for example valve means, preferably in the secondary air path 13, for opening/closing and/or controlling the size of the passage area of the secondary air path 13 with respect to the primary air path 12.

At the secondary air path 13, there are first water injection means 15 for injecting water into the secondary airflow.

Fourth water injection means 17 are provided for cooling the primary airflow in the primary air path 12.

As is generally known in connection with the injection of water, in whatever way, it is desirable to cool the air and to increase the mass flow rate in the installation, which offers various advantages.

In this example, a fan 18 is provided upstream of the first water injection means 15, at the secondary air path 13, for effecting a limited pressure increase in the secondary airflow. This fan 18 may have a low output and may, if appropriate, be electrically driven.

The installation shown in FIG. 1 also comprises a high-pressure combustion device 20 upstream of the inlet 8 of the compressor turbine 7. In this example, a low-pressure combustion device 25 is also provided, in the shown example downstream of the outlet 9 of the compressor turbine 7.

In the combustion devices 20, 25 each time a mixture of the compressed air (with the water vapour present therein) and of a suitable fuel is burnt.

The installation also comprises a power turbine 30, with a rotatable shaft 31 for releasing mechanical energy, for example for driving an electric generator 32. The power turbine 30 has an inlet 33, which in this case is connected to the outlet of the low-pressure combustion device 25, and an exhaust-gas outlet 35.

The installation also has an exhaust-gas pipe system, an inlet end 40 of which is connected to the exhaust-gas outlet 35 of the power turbine 30.

In this example, an outlet end of the secondary air path 13 is connected to the connection between the outlet 9 of the compressor turbine 7 and the inlet of the low-pressure combustion device 25.

The exhaust-gas pipe system comprises a primary exhaust-gas path 41 and a secondary exhaust-gas path 42, which two paths 41, 42 are connected to the outlet 35 of the power turbine 30, so that a primary exhaust-gas flow passes into the primary exhaust-gas path 41 and a secondary exhaust-gas flow passes into the secondary exhaust-gas path 42.

The primary exhaust-gas flow is preferably greater than the secondary exhaust-gas flow; by way of example, the ratio between the exhaust-gas flows is approximately the same as the ratio between the primary airflow and the secondary airflow as described above.

A first heat exchanger 50 effects a heat transfer between the exhaust gases in the exhaust-gas pipe system and the secondary airflow, preferably downstream of the first water injection means 15.

A second heat exchanger 60 effects heat transfer between the primary exhaust-gas flow in the primary path 41, on the one hand, and the primary airflow between the high-pressure compressor 4 and the inlet of the compressor turbine 7, on the other hand. In the specialist field, this second heat exchanger 60 is often referred to by the term recuperator.

A third heat exchanger 70 effects a heat transfer between the exhaust gases in the secondary exhaust-gas path 42 and the secondary airflow in the secondary air path 13 downstream of the first heat exchanger 50.

An outlet end of the secondary exhaust-gas path 42 is connected to the primary air path 41 downstream of the second heat exchanger 60. The first heat exchanger 50 is then arranged downstream of this connection, so that all the exhaust gases pass through the first heat exchanger 50.

A fourth heat exchanger 80 effects a heat transfer between the exhaust gases in the secondary exhaust-gas path 42 downstream of third heat exchanger 70, on the one hand, and the secondary airflow in the secondary air path 13 downstream of the first heat exchanger 50, on the other hand.

The first heat exchanger 50 is preferably designed to extract as much heat as possible from the exhaust gases before these exhaust gases are expelled.

If appropriate, injected water can be recovered by injecting water in the vicinity of the outlet of the exhaust-gas pipe system, which water is collected together with the water, which was injected earlier.

In the variant illustrated, the outlet end of the secondary air path 13 is connected to the connection between the compressor turbine 7 and the low-pressure combustion device 25.

In a variant, a low-pressure combustion device is positioned in the secondary air path 13 for burning a suitable mixture of the secondary airflow and a fuel. This can be achieved, for example, by incorporating the combustion device 25 which is now illustrated in the secondary air path 13, as indicated by dashed lines in FIG. 1, although obviously installations with a plurality of low-pressure combustion devices are also conceivable.

Furthermore, a fifth heat exchanger 90 and a sixth heat exchanger 95 are also provided in the installation shown, effecting a heat transfer between the exhaust gases in the primary exhaust-gas path 41, on the one hand, and the primary airflow between the high-pressure compressor 4 and the compressor turbine 7, on the other hand. In this case, as seen in the direction of the primary airflow, the fifth and sixth heat exchangers are arranged upstream of the second heat exchanger 60.

It can also be seen that second water injection means 100 are provided for the purpose of injecting water into the primary airflow between the fifth and sixth heat exchangers 90, 95.

Furthermore, the installation is provided with third water injection means 110 for injecting water into the. Primary airflow between the high-pressure compressor 4 and the sixth heat exchanger 95.

In a variant, it is possible for there to be provided a plurality of compressor turbines instead of a single compressor turbine, for example in such a manner that a compressor turbine drives the low-pressure compressor and another compressor turbine drives the high-pressure compressor.

In yet another variant, it is possible for a compressor turbine to drive an electric generator and for electric drive motors, which are coupled to the electric generator, to be provided for the purpose of driving one or more compressors of the compressor assembly.

The injection of water into the secondary airflow and the supply of heat which has been extracted from the exhaust gases to the secondary airflow may also take place in ways other than that shown in the figure. For example, it is possible for one or more heat exchangers to be arranged upstream of the water injection means or for the water injection means to be arranged at the same location as a heat exchanger, or for the water injection means to be arranged between the heat exchangers.

As mentioned earlier, the water injection may take place in various ways, depending on the situation, for example in the form of a mist, steam.

The water which is to be injected may be preheated with the aid of heat which is extracted from the exhaust gases, but also with the aid of water which is extracted from the compressed air downstream of a compressor.

The cooling means for cooling the primary gas flow upstream of the high-pressure compressor may also be designed other than with water injection, for example with injection of cold air or another cooling medium, or combinations of the various options. If appropriate, it is possible for the air to be cooled at the inlet of the low-pressure compressor or in the low-pressure compressor, for example if the installation is arranged in a hot environment.

The temperatures which may prevail in the installation as shown in FIG. 1 are listed below by way of non-limiting example.

Air originating from low-pressure compressor 130° C.
Primary airflow after cooling by means of fourth water injection means 40° C.
Primary airflow at high-pressure compressor outlet 165° C.
Primary airflow after cooling by means of third water injection means 90° C.
Primary airflow downstream of recuperator 640° C.
Primary airflow at high-pressure combustion device outlet 850° C.
primary airflow at compressor turbine outlet 620° C.
Airflow at low pressure combustion device outlet 900° C.
Exhaust gas flow at power turbine outlet 640° C.

What is claimed is:

1. An installation for generating energy, comprising:
   a compressor assembly for compressing air, comprising:
      a low-pressure compressor having an air inlet and an outlet,
      a high-pressure compressor having an inlet and an outlet, the outlet of the low-pressure compressor being connected to the inlet of the high-pressure compressor via a primary air path,
      a compressor turbine assembly for driving at least one-of the low-pressure compressor and the high-pressure compressor, the compressor turbine assembly having at least one compressor turbine and an inlet and an outlet, the inlet connected to the outlet of the high-pressure compressor;
   cooling means for cooling the air at a location which lies upstream of the outlet of the high-pressure compressor;
   a combustion device for burning a suitable mixture of compressed air and a fuel;
   a power turbine with a rotatable shaft for delivering mechanical energy, the power turbine having an inlet connected to the outlet of the compressor turbine assembly, and an exhaust-gas outlet;
   an exhaust-gas pipe system, an inlet end of which is connected to the exhaust-gas outlet of the power turbine;
   wherein a secondary air path is provided, which, at an inlet end thereof, is connected between the outlet of the low-pressure compressor and the inlet of the high-pressure compressor, so that of the compressed air originating from the outlet of the low-pressure compressor, a primary airflow passes via the primary air path to the high-pressure compressor and a secondary airflow passes into the secondary air path;
   a first water injection means provided at the secondary air path for injecting water into the secondary airflow; and
   wherein an outlet end of the secondary air path is connected to the connection between the outlet of the compressor turbine assembly and the inlet of the power turbine.

2. An installation according to claim 1, in which a fan is incorporated in the secondary air path for increasing the pressure of the secondary airflow.

3. An installation according to claim 1, in which a first heat exchanger is provided, which effects a heat transfer between the exhaust gases in the exhaust-gas pipe system and the secondary airflow, preferably downstream of the first water injection means.

4. An installation according to claim 3, in which the exhaust-gas pipe system comprises a primary exhaust-gas path and a secondary exhaust-gas path, which are connected to the outlet of the power turbine, so that a primary exhaust-gas flow passes into the primary exhaust-gas path and a secondary exhaust-gas flow passes into the secondary exhaust-gas path, in which a second heat exchanger is provided, which effects a heat transfer between the primary exhaust-gas flow, on the one hand, and the primary airflow between the high-pressure compressor and the inlet of the compressor turbine assembly, on the other hand, and in which a third heat exchanger is provided, which effects a heat transfer between the exhaust-gases in the secondary exhaust-gas path and the secondary airflow in the secondary air path.

5. An installation according to claim 3, in which the exhaust-gas pipe system comprises a primary exhaust-gas path and a secondary exhaust-gas path, which are connected to the outlet of the power turbine, so that a primary exhaust-gas flow passes into the primary exhaust-gas path and a secondary exhaust-gas flow passes into the secondary exhaust-gas path, in which a second heat exchanger is provided, which effects a heat transfer between the primary exhaust-gas flow, on the one hand, and the primary airflow between the high-pressure compressor and the inlet of the compressor turbine assembly, on the other hand, and in which a third heat exchanger is provided, which effects a heat transfer between the exhaust-gases in the secondary exhaust-gas path and the secondary airflow in the secondary air path, and in which the secondary exhaust-gas path is connected, by means of an outlet end, to the primary exhaust-gas path downstream of the second heat exchanger, and in which the first heat exchanger is arranged downstream of this connection.

6. An installation according to claim 3, in which the exhaust-gas pipe system comprises a primary exhaust-gas path and a secondary exhaust-gas path, which are connected to the outlet of the power turbine, so that a primary exhaust-gas flow passes into the primary exhaust-gas path and a secondary exhaust-gas flow passes into the secondary exhaust-gas path, in which a second heat exchanger is provided, which effects a heat transfer between the primary exhaust-gas flow, on the one hand, and the primary airflow between the high-pressure compressor and the inlet of the compressor turbine assembly, on the other hand, and in which a third heat exchanger is provided, which effects a heat transfer between the exhaust-gases in the secondary exhaust-gas path and the secondary airflow in the secondary air path, and in which a fourth heat exchanger is provided, which effects a heat transfer between the exhaust gases in the secondary exhaust-gas path downstream of the third heat exchanger, on the one hand, and the secondary airflow in the secondary air path downstream of the first heat exchanger, on the other hand.

7. An installation according to claim 3, in which fifth water injection means are provided for the purpose of injecting water into the secondary airflow downstream of the first heat exchanger, for example between the third and fourth heat exchangers.

8. An installation according to claim 1, in which a low-pressure combustion device is positioned between the outlet of the compressor turbine assembly and the power turbine.

9. An installation according to claim 8, in which the outlet end of the secondary air path is connected to the connection between the compressor turbine assembly and the low-pressure combustion device.

10. An installation according to claim 1, in which a low-pressure combustion device is positioned in the secondary air path for the purpose of burning a suitable mixture of the secondary airflow and a fuel.

11. An installation according to claim 1, in which a fifth and a sixth heat exchanger are provided, which effect a heat transfer between the exhaust gases in the primary exhaust-gas path, on the one hand, and the primary airflow between the high-pressure compressor and the compressor turbine assembly, on the other hand.

12. An installation according to claim 11, in which second water injection means are provided for the purpose of injecting water into the primary airflow between the fifth and sixth heat exchangers.

13. An installation according to claim 1, in which third water injection means are provided for the purpose of injecting water into the primary airflow downstream of the high-pressure compressor.

14. An installation according to claim 1, in which the cooling means for cooling the primary airflow between the outlet of the low-pressure compressor and the outlet of the high-pressure compressor are designed as fourth water injection means.

15. An installation according to claim 1, in which a high-pressure combustion device is positioned between the outlet of the high-pressure compressor and the inlet of the compressor turbine assembly, for the purpose of burning a suitable mixture comprising the compressed air and a fuel.

16. An installation according to claim 1, in which the compressor turbine assembly includes a single compressor turbine, which is arranged on a common shaft with the low-pressure compressor and the high-pressure compressor.

17. An installation according to claims 1, in which a compressor turbine drives an electric generator, and in which electric drive motors, which are coupled to the electric generator, are provided for the purpose of driving one or more compressors of the compressor assembly.

18. An installation according to claim 1, wherein the compressor turbine assembly comprises a plurality of compressor turbines arranged in series.

* * * * *